March 3, 1970  J. A. WOODEN  3,498,529
SAND TRAP INDUSTRIAL ENGINE COOLING FAN
Filed May 31, 1968

INVENTOR
JOHN A. WOODEN
BY
Woodard, Weikart, Emhardt, ¡Naughton
Attorneys

United States Patent Office 3,498,529
Patented Mar. 3, 1970

3,498,529
SAND TRAP INDUSTRIAL ENGINE COOLING FAN
John A. Wooden, Indianapolis, Ind., assignor to Brookside Corporation, McCordsville, Ind., a corporation of Indiana
Filed May 31, 1968, Ser. No. 733,628
Int. Cl. F04d 19/00, 29/52
U.S. Cl. 230—120          3 Claims

ABSTRACT OF THE DISCLOSURE

The invention is embodied in an annular flange encircling the air opening in the fan shroud adjacent the cooling fan of an industrial engine radiator, the flange presenting a smoothly curved surface to the fan periphery but forming an annular recess at the flange face remote from the fan periphery for trapping fan blade eroding particles, such as sand, entrained in the air flow induced by the fan.

BACKGROUND OF THE INVENTION

Internal combustion engines, operated in industrial or mining application, conventionally suffer from severe pitting or erosion to the fan blade tip area because of sand or other sharp particles entrained in the cooling fan induced air stream. Industrial tractor engines often operate in dust and sand laden atmospheres and, because of the high velocity, high volume air flow induced through their cooling radiator, the fan blade tips are particularly subject to erosion and deterioration.

SUMMARY OF THE INVENTION

The structure embodying the present invention provides an annular recess around the margin of the air passage through the fan shroud of an engine radiator cooling fan, the recess serving to trap particles such as sand entrained in the air stream adjacent the fan blade tips.

DESCRIPTION OF THE PREFERRED EMBODIMENTS

Figure 1:
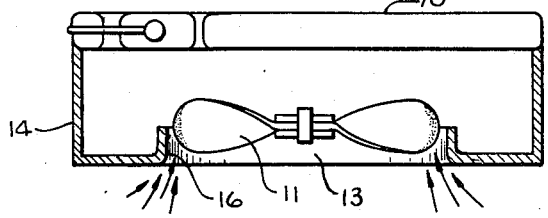
FIG. 1 is a top, sectional view of a prior art industrial engine radiator and cooling fan structure.

Referring initially to FIG. 1 which illustrates the prior art arrangement, an engine radiator is indicated at 10 and the axial flow cooling fan is shown at 11. Mounted with the radiator and provided with a central opening 13 is a fan shroud 14 which has the conventional, smoothly curved surface 16 at the fan blade tip area. As indicated in FIG. 1, air moving axially and radially inward toward the aperture 13, if it has sharp particles such as sand or the like entrained in it, will erode the blade tip areas.

Figure 2:
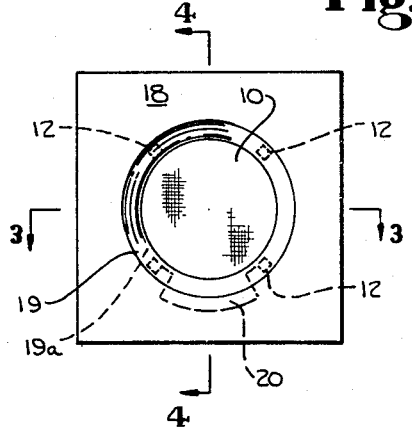
FIG. 2 is a front view showing the structure of FIG. 1.
Figure 3:
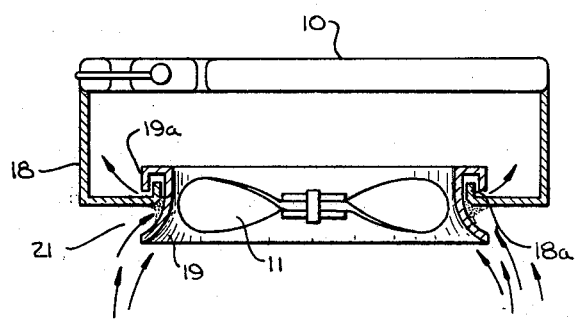
FIG. 3 is a sectional view taken generally along the line 3—3 of FIG. 2.
Figure 4:
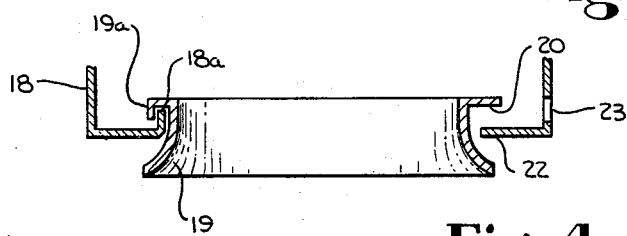
FIG. 4 is a fragmentary side sectional view taken generally along the line 4—4 of FIG. 2.

Referring to FIG. 2 which embodies the invention, the fan shroud 18, around the margin of the air flow opening, has rigidly secured thereto an annual number providing flange 19 which extends around the opening and extends axially a short distance upstream of the the fan 11. Attachment braces, or brackets 12 (FIG. 2) spaced around the aperture 13, serve to hold the flange 19 rigidly but slightly spaced from the shroud 18 to permit air to flow over the flange and tortuously outward past the inner flange portion 19a, as indicated in FIG. 3. The flange 19 is shaped so as to present a smoothly curved, convex surface adjacent the fan blade tip area, however, at the face of the flange remote from the blade tip area a recess 21 is formed with the adjacent surface of the fan shroud 18. During operation of the fan, as indicated in FIG. 2, air moving axially and radially inward toward the fan blade tips will be cleared of particles such as sand because of the higher inertia of the sand particles as the air moves in the curving path required for entry into the fan blade tip area. The particles are trapped at the flange-shroud junction and the air flow through the tortuous path referred to above accumulating the particles at the junction. To provide a means by which the trapped sand may be cleared from the shroud assembly, as may best be seen in FIGS. 2 and 4, a segment 20 of the inner flange portion 19a is flattened and, adjacent to the flattened segment, the flange 18a of the shroud is flattened as indicated at 22 in FIG. 4. An elongated aperture 23 (FIG. 4) is provided in the base of the shroud. Sand or other grannular debris, accumulating in the recess 21, may thus be removed by gravity, from the assembly through the passage between the portions 20 and 22 and through the aperture 23.

Figure 5:
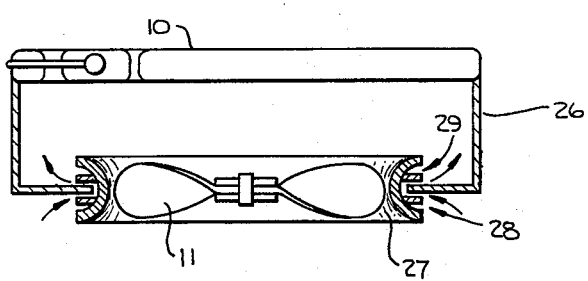
FIG. 5 is a top sectional view illustrating a modified form of the invention.

Referring to FIG. 5, a modified form of the shroud flange is illustrated which provides the particle trapping function for either forward or reverse air flow induced by the fan. The shroud 26 carries spaced brackets (not shown) to which is secured the orifice member 27 which encircles an air flow opening and extends a short distance both upstream and downstream of the blade tip area. A sand entrapping recess is thereby provided at 26 and 27, that is, on both sides of the fan shroud margin so that the sand entrapping function is accomplished for both possible directions of air flow induced by the fan, the spacing between the member 27 and shroud 26 permitting the flow of air trapped behind the flange but retaining sand or other particles entrained in the air stream in the recess 28 or 29. The arrangement described with respect to FIGS. 2–4, and that of FIG. 5 does not remove sand from all the air moved by the fan, but it is particularly effective in removing sand from the blade tip area, where air velocity is highest and where the major erosion damage to the blades normally occurs.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

I claim:
1. In a fan shroud of the type having an opening generally encircling the peripheral area of air moving fan blades, the improvement comprising an annular member rigidly attached to the fan shroud and having a flange spaced inwardly from the margin of the shroud opening and formed to extend axially inwardly and outwardly around the opening and then in a reverse axial direction to thereby form a recess at the face of the flange remote from the fan tips which traps particles entrained in the air stream induced by the fan but permits air flow between the flange and the margin of the opening.

2. A fan shroud of the type claimed in claim 1 in which said annular member extend through the shroud opening and is provided with radially outwardly directed flanges extending beyond the margin of the shroud opening spaced from and on opposite sides of the shroud to form a particle-trapping recess on both sides of the blade tips to accommodate air flow induced by the fan in either direction through the shroud opening.

3. A fan shroud of the type claimed in claim 1 in which said flange and said adjacent shroud are formed to provide a particle release passage along the lower margin of the flange and said shroud is apertured below the particle release passage to permit particles trapped at said recess to fall to the exterior of the shroud.

References Cited

UNITED STATES PATENTS 2,503,072   4/1950   Schneider _____ 230—120
3,028,072   4/1962   Atalla _____ 230—120 XR HENRY F. RADUAZO, Primary Examiner U.S. Cl. X.R.

230—133, 132